(12) United States Patent
Hatchell et al.

(10) Patent No.: US 9,103,940 B2
(45) Date of Patent: Aug. 11, 2015

(54) SEISMIC CLOCK TIMING CORRECTION USING OCEAN ACOUSTIC WAVES

(75) Inventors: Paul James Hatchell, Katy, TX (US); Kurang Jvalant Mehta, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 533 days.

(21) Appl. No.: 13/513,206

(22) PCT Filed: Dec. 2, 2010

(86) PCT No.: PCT/US2010/058635
§ 371 (c)(1),
(2), (4) Date: Jun. 1, 2012

(87) PCT Pub. No.: WO2011/068922
PCT Pub. Date: Jun. 9, 2011

(65) Prior Publication Data
US 2012/0287753 A1  Nov. 15, 2012

Related U.S. Application Data

(60) Provisional application No. 61/266,335, filed on Dec. 3, 2009.

(51) Int. Cl.
G01V 1/38  (2006.01)

(52) U.S. Cl.
CPC ........................................ G01V 1/38 (2013.01)

(58) Field of Classification Search
USPC ........................................................... 367/38
See application file for complete search history.

(56) References Cited

U.S. PATENT DOCUMENTS

| 5,333,129 | A | * | 7/1994 | Buckingham | 367/7 |
|---|---|---|---|---|---|
| 5,388,127 | A | | 2/1995 | Scarpa | 375/120 |
| 6,282,007 | B1 | | 8/2001 | Roberts | 359/181 |
| 6,509,990 | B1 | | 1/2003 | Roberts | 359/158 |
| 6,792,215 | B1 | | 9/2004 | Kobayashi et al. | 398/161 |
| 7,242,637 | B2 | * | 7/2007 | Van Den Beukel et al. | 367/38 |
| 7,551,516 | B2 | * | 6/2009 | Harmon | 367/25 |
| 2005/0149267 | A1 | * | 7/2005 | Van Den Beukel et al. | 702/14 |
| 2006/0180349 | A1 | * | 8/2006 | Dashevskiy | 175/40 |
| 2006/0203614 | A1 | * | 9/2006 | Harmon | 367/57 |
| 2007/0032954 | A1 | * | 2/2007 | Moore et al. | 702/5 |
| 2007/0104028 | A1 | * | 5/2007 | Van Manen et al. | 367/38 |
| 2007/0233437 | A1 | * | 10/2007 | Manen et al. | 703/2 |

(Continued)

OTHER PUBLICATIONS

Pekeris, C. L., "Theory of Propagation of Explosive Sound in Shallow Water", Geol. Soc. Am. Mem. 27, pp. 1-117 (1948).

(Continued)

*Primary Examiner* — James Hulka

(57) ABSTRACT

A method for identifying clock timing discrepancies in a plurality of clocks that are each associated with a seismic receiver, comprises the steps of collecting from at least a pair of receivers a data set corresponding to a selected time period, cross-correlating the data sets between at least one pair of receivers so as to produce cross-correlated data for positive, zero, and negative time lags, comparing the cross-correlated data for the positive and negative time lags to measure a timing asymmetry about the zero-lag time, and, for a receiver pair for which there is a non-zero timing asymmetry, using the asymmetry to identify a timing discrepancy between the clocks associated with that receiver pair. The each data set can be filtered so as to obtain data in a selected frequency range, which may avoid an active shot frequency. The data may be collected in the absence of active seismic shots.

15 Claims, 3 Drawing Sheets

(56) References Cited

U.S. PATENT DOCUMENTS

| | | | |
|---|---|---|---|
| 2008/0137474 A1* | 6/2008 | Dashevskiy et al. | 367/13 |
| 2009/0012711 A1* | 1/2009 | Harmon | 702/9 |
| 2010/0042326 A1* | 2/2010 | Bourne et al. | 702/11 |
| 2010/0107753 A1* | 5/2010 | Bourne et al. | 73/152.39 |
| 2010/0212909 A1* | 8/2010 | Baumstein et al. | 166/369 |
| 2010/0265797 A1* | 10/2010 | Robertsson et al. | 367/43 |
| 2013/0028051 A1* | 1/2013 | Barkved et al. | 367/40 |

OTHER PUBLICATIONS

Hatchell, P. J. et al., "Passive Interferometry of Deepwater Ocean Bottom Seismic Data", 72nd EAGE Conference and Exhibition Incorporating SPE Europe 2010 pp. 1886-1890 (Jun. 14, 2010).

Hatchell, P. et al., "Ocean Bottom Seismic (OBS) Timing Drift Correction Using Passive Seismic Data", SEG Annual Meeting, Denver; pp. 2054-2058 (Oct. 17, 2010).

Dellinger et al., "Low-Frequency Virtual Point-Source Interferometry Using Conventional Sensors", EAGE 71th Conference and Exhibition, Expanded Abstracts (Jun. 2009).

Bakulin, A. et al., "The Virtual Source Method: Theory and Case Study", Geophysics, 71, SI139-SI150, 2006.

Derode, A. et al., "How to Estimate the Green's Function for a Heterogeneous Medium Between Two Passive Sensors? Application to Acoustic Waves", Applied Physics Letters, vol. 83, 3054-3056, 2003.

Wapenaar, K. "Retrievingthe Elastodynamic Green's Function of an Arbitrary Inhomogeneous Medium by Cross-Correlation", Physical Review Letters, vol. 93, 254301, 2004.

Press, F., et al., Propagation of Explosive Sound in a Liquid Layer Overlying a Semi-Infinite Elastic Solid; Geophysics, 15, No. 3, 426-446.

Vasconcelos, I., et al., "Seismic Interferometry by Deconvolution: Theory and Examples", EAGE 69th Conference and Technical Exhibition (Jun. 2007).

Curtis, A., et al., "Seismic interferometry—turning noise into signal", The Leading Edge pp. 1082-1092 (Sep. 2006).

Schuster, G.T., "Theory of Daylight/Interferometric imaging: Tutorial", EAGE 63rd Conference & Exhibition, (Jun. 2001).

* cited by examiner

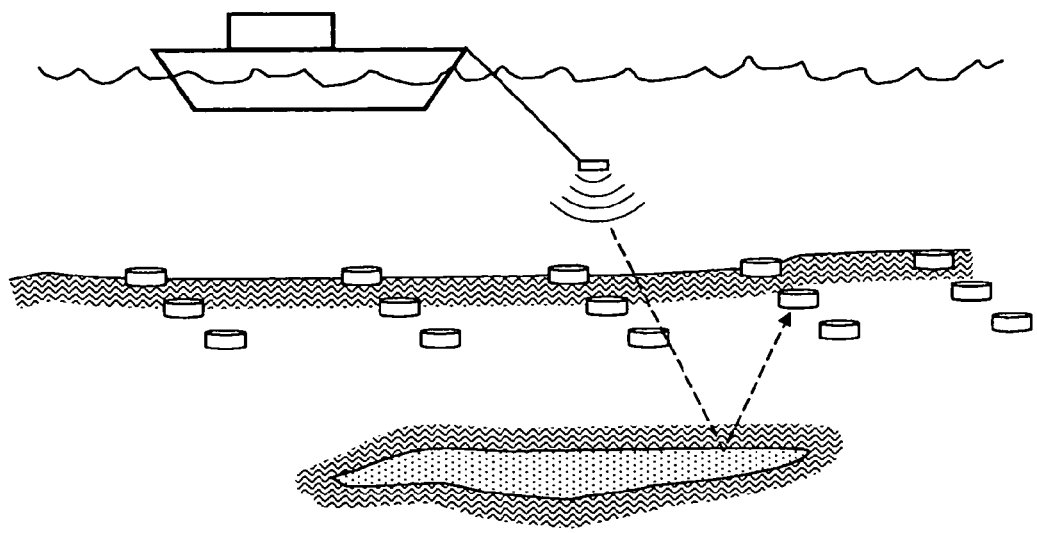
Fig. 1
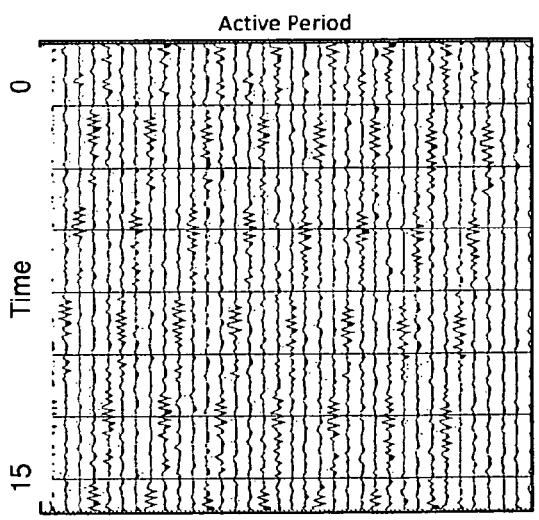 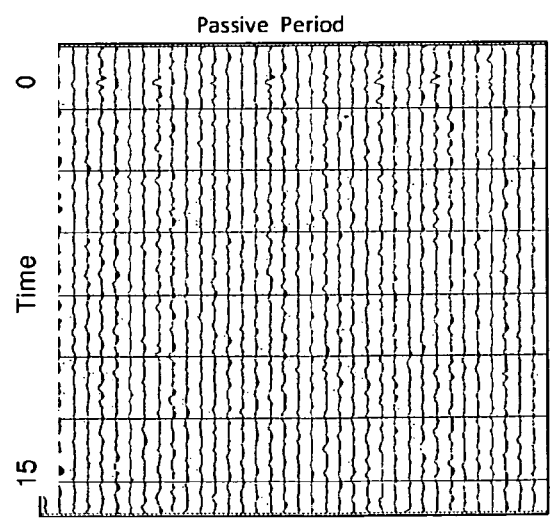
Fig. 2  Fig. 3

SEISMIC CLOCK TIMING CORRECTION USING OCEAN ACOUSTIC WAVES

PRIORITY CLAIM

The present application is a national filing under 35 USC §371 of PCT/US2010/058635, filed 2 Dec. 2010, which claims priority from U.S. Provisional Application 61/266,335, filed 3 Dec. 2009, both of which are incorporated by reference.

RELATED CASES

Not applicable.

FIELD OF THE INVENTION

The invention relates to clocks used in ocean bottom sensors for recording seismic signals and more particularly to methods for correcting for clock timing errors and inaccurate positioning information.

BACKGROUND OF THE INVENTION

In deepwater ocean bottom nodes surveys, autonomous seismic detectors are placed on the seabed and make continuous or intermittent seismic recordings. During the recording periods, a plurality of seismic signals ("shots") are transmitted into the ocean and/or into the seafloor for the purpose of seismically illuminating the subsurface formations, as illustrated schematically in FIG. 1. Seismic signals that have been refracted, reflected and/or transmitted through the subsurface are recorded by the seismic detectors. After recording the resulting seismic signals for a period of time, the nodes are recovered and the seismic data they have recorded are processed for the purpose of extracting information about the subsurface. In order to extract meaningful information, it is advantageous to determine the location and relative timing of each seismic node.

Typically, the placement of any given node on the seabed is known to only limited accuracy, due to limitations of the positioning and placement equipment. In addition, there may be operator errors in the positioning process, which add to the errors arising from equipment limitations.

Still further, the very precise clocks that are needed for seismic data analyses tend to drift unpredictably over time. Some clocks may lose time while others may gain it, and the rate of drift for a given clock may vary over time. Over the two month time period of a typical seismic survey, clocks may easily drift as much as 50 ms in either direction. Finally, operator errors in the initial clock synchronization or final data collection may add to the drift-derived errors.

Knowledge about the location of the seismic node may be improved by comparing the arrival times of many active shots from the sea surface to each node. This location will have limited accuracy, however, because of uncertainties in the location of the active shots and changes in water velocity over the time interval of the active shooting program.

For these reasons, there remains a need for improving the degree of precision that is possible in ocean bottom seismic surveys.

SUMMARY OF THE INVENTION

The present invention provides methods and systems for improving the degree of precision that is possible in ocean bottom seismic surveys. One preferred embodiment of the present invention provides a method for identifying clock timing discrepancies in a plurality of clocks that are each associated with a seismic receiver, comprising the steps of a) collecting from at least a pair of receivers a data set corresponding to a selected time period; b) cross-correlating the data sets between at least one pair of receivers so as to produce interferometric data for positive, zero, and negative time lags; c) comparing the interferometric data for the positive and negative time lags to measure a timing asymmetry about the zero-lag time; and d) for a receiver pair for which there is a non-zero timing asymmetry, using the asymmetry to identify a timing discrepancy between the clocks associated with that receiver pair.

The method may further include the step of filtering each data set using a frequency filter so as to obtain data in a selected frequency range before step c). The frequency filter may be selected so as to avoid an active shot frequency or may be selected using a function of water depth and water velocity.

Step a) may be carried out in the absence of active seismic shots and may include sensing ocean sound waves.

Step b) may include selecting the positive and negative time lags so as to obtain a set of cross-correlated data that includes both causal and acausal events for each receiver pair.

Step d) may include, for each receiver, determining whether the causal and acausal events are equidistant in time from the zero-lag time. This step may be carried out using at least one technique selected from the group consisting of visual inspection, snap trough analysis, and feature comparison or cross-correlating the positive lag trace with the negative lag trace to find the optimal discrepancy that aligns the positive and negative traces. Step d) is optimally carried out in a time window that includes the causal and acausal events.

The method may further including repeating steps a) through c) using more than two receivers and averaging all of the timing discrepancies from every receiver to every other receiver. The method may further include comparing each correlation with every other correlation to the average of the timing discrepancies.

Similarly, the method may include repeating steps a) through c) over time and identifying rate of clock error accumulation.

In other embodiments, a method is provided for detecting position errors in a plurality of receivers that are each associated with a seismic receiver, comprising the steps of: a) selecting at least two pairs of receivers for which presumptive position data are known; b) collecting from said pairs of receivers a data set corresponding to a selected time period; c) cross-correlating the data sets between each pair of receivers so as to produce interferometric data; and d) comparing the interferometric of said pairs of receivers and using the output of said comparison to identify detectors that are anomalous and whose presumptive position data are therefore incorrect. Step d) may comprise using at least one technique selected from the group consisting of visual inspection, snap trough analysis, feature comparison, and linear interpolation with arrival time versus presumptive position. The method may further include the step of using arrival times between multiple receivers in a least squares network adjustment.

As used in this specification and claims the following terms shall have the following meanings.

"Ocean acoustic waves" refers to acoustic energy propagating through water column and detectable at seafloor. This energy can be generated by wind, gravity, surface activity, tides, currents, and/or thermal flow, among others.

"Causal" and "acausal" responses are responses generated by cross-correlation of recorded data at positive and negative lag times, respectively.

"Dispersive linear moveout" refers to a dispersive wave that is substantially locally linear.

"Omnidirectional" is intended to encompass ambient waves that are substantially omnidirectional, as distinguished from waves from a point source or from a single direction.

In the description that follows, the words "receiver," "node," and "detector" may be used interchangeably and it will be understood that, for purposes of describing the invention, they are intended have the same meaning.

BRIEF DESCRIPTION OF THE DRAWINGS

For a more detailed understanding of the invention, reference is made to the accompanying wherein:

FIG. 1 is a schematic diagram of a marine seismic surveying system in which the present invention could be used;

FIG. 2 is a plot showing continuous data broken into ~15 second long traces, from a single seismic receiver (hydrophone) after applying a 5 Hz low-pass filter during an interval of active shooting in which the shot interval is approximately 12 sec.;

FIG. 3 is a plot analogous to FIG. 2, but recorded during a time period where no active shots were fired;

DETAILED DESCRIPTION OF A PREFERRED EMBODIMENT

Figure 4:
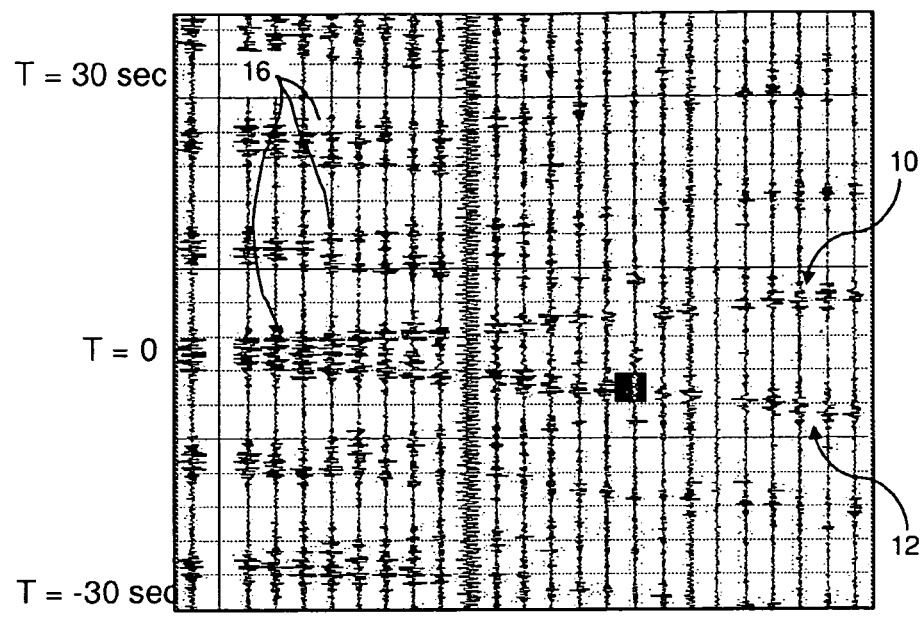
FIG. 4 is a plot showing data derived by cross-correlating 45 days of continuous signals after applying a 5 Hz low-pass filter for a reference hydrophone receiver with signals from several other receivers located at increasing distance from the reference receiver.

In preferred embodiments, the present invention is carried out in a marine environment such as is illustrated in FIG. 1. Although one preferred embodiment includes receivers that are spaced apart in a regular array, it is not necessary to the success of the invention that the receivers be equally spaced, in rows, or in an array. Still further, and as discussed below, it is not necessary that the present invention be carried out offshore.

The sensors useful in the present invention may be an array of receiver nodes or a row of receivers spaced apart along an ocean-bottom cable. During the survey period, the present invention is not dependent on communication between an individual receiver and either its neighbors or a central device. In preferred embodiments, the invention allows for correction of clock times in multiple receivers that have not been connected to any synchronizing device for a period of time sufficient to allow drift to occur.

Referring now to FIGS. 2 and 3, continuous recordings for a single hydrophone receiver recorded during periods of "active" shooting and during a "passive" interval where no shooting was taking place are shown. In FIG. 2, the intermittent (12 sec. period) shot signals can clearly be seen despite the application of a 5 Hz low-pass filter to the data. In FIG. 3, recorded during "quiet" periods during which no coherent artificial noise was produced, no particular signal is evident, as the receivers recorded only the ambient noise signals.

It has been discovered that certain omnidirectional waves that exist in the ocean can be used advantageously to create interferometrically derived clock comparisons, which can in turn be used to identify and correct clock timing errors. In particular, it has been discovered that low-frequency waves travelling through the ocean are detected by seismic detectors and that cross-correlations of the resulting signals across pairs of receivers gives an accurate measurement of clock drift.

The ocean acoustic wave energy is continuously present and is recorded by all seismic sensors placed on the seafloor. If a sensor array is provided and the data recorded at a given reference receiver is correlated with the recording at another receiver for positive, zero, and negative time lags, the result is a trace that contains the relative arrival time information of the ocean waves that have traveled in both directions between the reference receiver and the other receiver. In the absence of active shots or other artificial noise sources, the strongest arrival in such interferometric data in deepwater environments will be the guided arrival (of the omnidirectional waves) along the water column, and will be represented by dispersive linear moveout. For perfect node location and accurate timing, this event will behave predictably between the detectors. Any outliers along this arrival can be assumed to be attributable to timing error and/or node positioning errors. As the arrival times for waves propagating in the direction from the reference receiver to another receiver should be the similar to the reciprocal propagation from the other receiver to the reference receiver, it is expected that, for detectors with accurate timing, causal and acausal arrivals arrive symmetrically with respect to zero time lag.

Thus, in accordance with a preferred embodiment of the invention, the receiver signals in a receiver array are cross-correlated to give an interferometric trace. As shown in FIG. 4, the resulting plot for each receiver includes a clear causal event 10 and acausal event 12 which is partially repeated at ~12 sec intervals because of the presence of the active shots 16. In FIG. 4 the traces are shown in order of increasing offset from the reference receiver.

Figure 5:
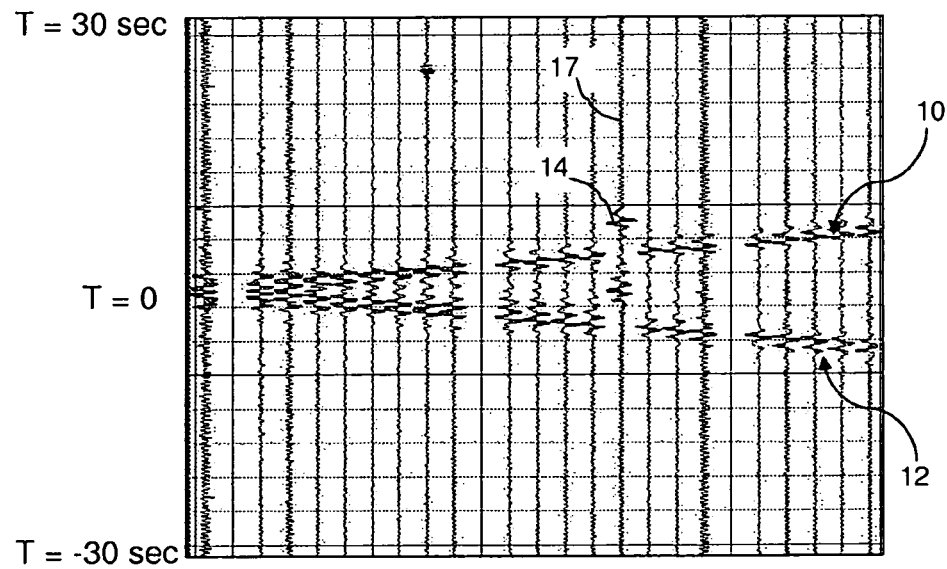
FIG. 5 is a plot showing data derived by cross-correlating the same signals used in FIG. 4 during passive intervals by muting data collected during active shooting times within the 45 days.

When only data from passive periods are used, the causal and acausal events discernable in FIG. 4 are markedly clearer, as shown in FIG. 5. Passive periods, i.e. periods during which no active shots are fired may occur during seismic surveys during periods of bad weather, equipment stoppage, or the like. Passive periods as short as 1 hour can give meaningful data for use in this invention, but data collection periods on the order of at least tens of hours are preferred. Data collection periods do not have to be continuous.

In addition, FIG. 5 shows a clear outlier 14, in which the timing of the waveform for the receiver whose trace is shown at 17 is not equidistant from the zero lag time T=0. This is an indication that there is a disparity between clock in that receiver line and the clock in the reference receiver. The detection of outlier 14 can be carried out using any suitable technique, including but not limited to visual inspection, snap trough analysis, and feature comparison.

Figure 6:
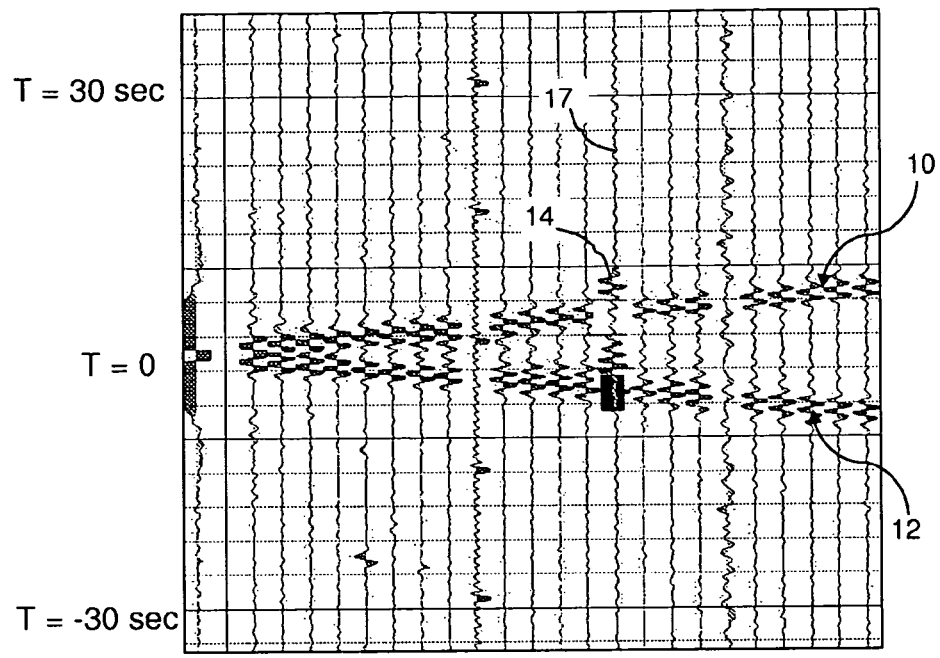
FIG. 6 is a plot showing data derived by cross-correlating signals for the same time period used in FIG. 4, but after applying a 2 Hz low-pass filter to the data.

Alternatively or in addition, a frequency filter can be applied to the data before cross-correlation. Since the shot frequency bandwidth is known, a low-pass filter with a pass threshold below, and more preferably well below, the shot frequency bandwidth will effectively remove the shot signals from the cross-correlation, as can be seen in FIG. 6, which spans both active and passive time periods. Thus, like FIG. 5, FIG. 6 clearly shows the causal and acausal effects 10, 12 and the outlying trace 17.

While the interferometric signals useful for the present invention could theoretically be generated using active sources, the accuracy of interferometric data depends in part on the multi-directionality of the source signal. Thus, data from ocean acoustic waves, which can be considered omni-directional, are preferred for use in the present methods over active shots, which are inherently uni-directional or require that sources be placed in several positions. Nonetheless, pairs of spaced-apart active sources moving through several positions could be used to generate substantially equivalent data.

In another embodiment, the causal and acausal signals for a given receiver pair can be compared to the zero lag time. If the clocks in the reference receiver and the given receiver are both accurate, the causal and acausal signals will be equidistant from the zero lag time, as illustrated in most of the traces in FIGS. 5 and 6. Conversely, if one or both of the clocks is inaccurate, the causal and acausal signals will not be equidistant from the zero lag time, as illustrated at trace 17 in FIGS. 5 and 6.

In some embodiments, it may be desirable to compare the clock disparity for each receiver pair to an average disparity taken across several receiver pairs, so as to produce a suggested correction value for each clock. In preferred embodiments, the timing discrepancies between a given receiver and all other receivers are averaged.

The noise in an interferometric analysis will depend on the average uniformity of omni-directionality of the energy source and longer time intervals will improve the analysis. For shorter time intervals, we have discovered that the ambient ocean wave energy is not purely omni-directional, but arrives preferentially from certain azimuthal directions. This will produce spatially correlated errors in the timing error estimations. By averaging the timing error estimate from a given node with respect to many other nodes located at various positions, preferably various azimuthal positions, these errors can be reduced.

One advantage of the present invention is that it can be used to identify inaccurate clocks even when the clock identifying information has become lost or corrupted. Likewise, the present invention can be used to confirm that each clock/receiver pair is correctly identified, to identify which clock belongs with each receiver line when the clock/receiver information has become lost or corrupted, and/or to correct position information when receiver position information has become lost or corrupted.

Figure 7:
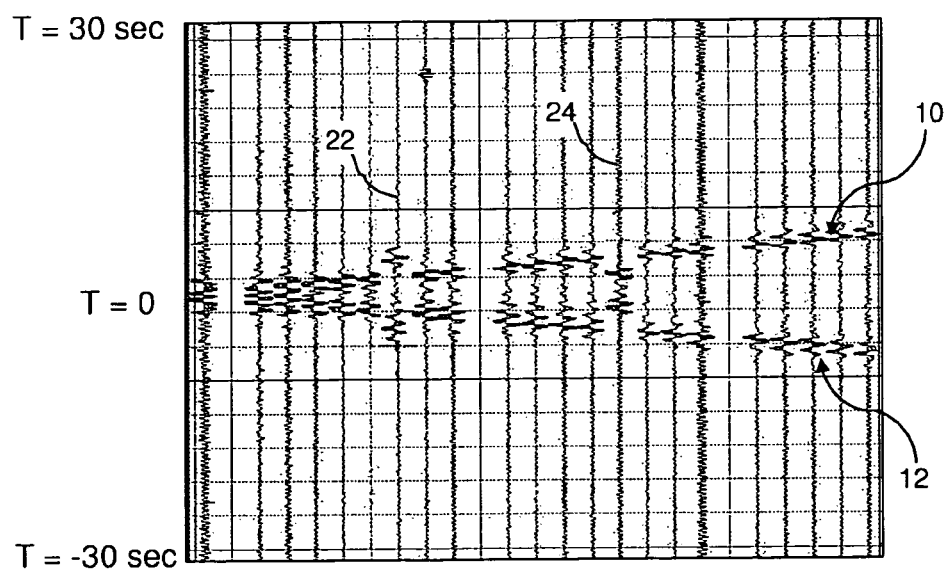
FIG. 7 is a plot of the same data as FIG. 5, but in which position information about one receiver pair has been switched.

Correcting position information may include looking for such outliers along the so-called guided arrival to detect node positioning errors. Thus, in one embodiment, the presence of a seismic detector with a position error can be detected by comparing the output of the cross-correlation of several pairs of nodes for which presumptive position data are available. The comparison can be carried out using any known technique, including using a linear interpolation with arrival time versus presumptive position data to identify detectors that are anomalous and therefore mispositioned. Referring briefly to FIG. 7, it can be seen that the position data for the receivers whose traces are shown at 22 and 24 have apparently been switched.

When this technique is carried out for a set of receiver pairs that are believed to lie at a particular separation from one another, it is possible to determine a "best fit" relationship between the arrival time and separation distance of the guided wave arrival that can then be used to identify anomalous receivers.

Still further, arrival times between two receivers can be used to determine their separation, and arrival times between multiple receivers can be used in a least squares (LSQ) network adjustment (trilateration), such as are known in the art.

Another advantage of the invention is that it can be used during times when sea conditions prevent the acquisition of conventional data. Noisy passive data may be recorded, for example, during periods of shot inactivity during storms. During these times, active shooting is typically curtailed in the field because the noise degrades the quality of active seismic.

Still another advantage of the invention is that it enables measurement of clock drift rate over time without requiring any additional equipment or calibration. Data from different time intervals can be used to determine clock drift rate and whether it is constant over time. The resulting information can be used to correct concurrently-collected seismic data, thereby allowing more accurate information about the subsurface to be provided.

While the present invention has been described and disclosed with respect to preferred embodiments of the invention, it will be understood that variations and modifications can be made without departing from the scope of the invention, which is set out in the claims that follow. For example, while a preferred embodiment has been described herein with respect to ocean acoustic waves, it will be understood that the concepts disclosed are applicable in any environment in which omnidirectional or "daylight" acoustic noise exists or can be simulated. Thus, the present techniques can be used in onshore applications as well as marine; with adequate coupling, microseisms and other ambient or artificial noise can function in the same manner as the ocean acoustic waves described herein.

Unless expressly stated, the sequential recitation of steps in the claims is not intended to include a requirement that the steps are performed in a particular order.

The invention claimed is:

1. A method for identifying clock timing discrepancies in a plurality of clocks that are each associated with a seismic receiver placed on a seafloor in a water column, comprising the steps of:
   a) collecting from at least a pair of receivers placed on the seafloor a data set corresponding to a selected time period said data set comprising guided wave arrivals of multi-directional waves propagating through the water column;
   b) cross-correlating the data sets between at least one pair of receivers so as to produce interferometric data for positive, zero, and negative time lags;
   c) comparing the interferometric data for the positive and negative time lags to measure a timing asymmetry between causal and acausal events about the zero-lag time; and
   d) for a receiver pair for which there is a non-zero timing asymmetry between the causal and acausal events, using the asymmetry to identify a timing discrepancy between the clocks associated with that receiver pair.

2. The method of claim 1, further including the step of filtering each data set using a frequency filter so as to obtain data in a selected frequency range before step c).

3. The method of claim 2 wherein the frequency filter is selected so as to avoid an active shot frequency.

4. The method of claim 2 wherein the frequency filter is selected using a function of water depth and water velocity.

5. The method of claim 1 wherein step a) is carried out in the absence of active seismic shots.

6. The method of claim 1 wherein step a) includes sensing ocean acoustic waves.

7. The method of claim 1 wherein step b) includes selecting the positive and negative time lags so as to obtain a set of cross-correlated data that includes both causal and acausal events for each receiver pair.

8. The method of claim 1 wherein step d) includes, for each receiver, determining whether the causal and acausal events are equidistant in time from the zero-lag time.

9. The method of claim 8 wherein determining whether the causal and acausal events are equidistant in time from the zero lag time is carried out using at least one technique selected from the group consisting of visual inspection, snap trough analysis, and feature comparison.

10. The method of claim 1 wherein step d) includes cross-correlating the positive lag trace with the negative lag trace to find the optimal discrepancy that aligns the positive and negative traces.

11. The method of claim 10 wherein the cross-correlation in step d) is carried out in a time window that includes the causal and acausal events.

12. The method of claim 1, further including repeating steps a) through c) using more than two receivers and averaging all of the timing discrepancies from every receiver to every other receiver.

13. The method of claim 12, further including comparing each correlation with every other correlation to the average of the timing discrepancies.

14. The method of claim 1, further including repeating steps a) through c) over at least two time intervals and identifying rate of clock error accumulation.

15. A method for detecting position errors in a plurality of receivers that are each associated with a seismic receiver placed on a seafloor in a water column, comprising the steps of:
   a) selecting at least two pairs of receivers placed on the seafloor for which presumptive position data are known;
   b) collecting from said pairs of receivers a data set corresponding to a selected time period, said data set comprising guided wave arrivals of multi-directional waves propagating through the water column;
   c) cross-correlating the data sets between each pair of receivers so as to produce interferometric data; and
   d) comparing causal and acausal events in the interferometric data of said pairs of receivers and using the output of said comparison to identify detectors that are anomalous and whose presumptive position data are therefore incorrect.

* * * * *